(12) United States Patent
Yerradoddi et al.

(10) Patent No.: US 11,537,461 B2
(45) Date of Patent: Dec. 27, 2022

(54) ERROR RESOLUTION FOR INTERACTIONS WITH USER PAGES

(71) Applicant: PayPal, Inc., San Jose, CA (US)

(72) Inventors: Chengal Reddy Yerradoddi, Austin, TX (US); Phanendra Mallampalli, Leander, TX (US); Rajesh Cherukuri, Austin, TX (US); Jesse Stuart Ports, Leander, TX (US); Venkata Naga Sai Ranga Rao Chadalawada, Austin, TX (US)

(73) Assignee: PayPal, Inc., San Jose, CA (US)

( * ) Notice: Subject to any disclaimer, the term of this patent is extended or adjusted under 35 U.S.C. 154(b) by 241 days.

(21) Appl. No.: 16/878,358

(22) Filed: May 19, 2020

(65) Prior Publication Data

US 2021/0365310 A1   Nov. 25, 2021

(51) Int. Cl.
| | |
|---|---|
| *G06F 11/07* | (2006.01) |
| *G06Q 20/10* | (2012.01) |
| *G06F 11/34* | (2006.01) |
| *G06N 20/00* | (2019.01) |
| *G06F 11/30* | (2006.01) |

(52) U.S. Cl.
CPC .......... *G06F 11/079* (2013.01); *G06F 11/302* (2013.01); *G06F 11/3438* (2013.01); *G06N 20/00* (2019.01); *G06Q 20/108* (2013.01)

(58) Field of Classification Search
CPC .............. G06F 11/079; G06F 11/0793; G06F 11/3438; G06F 11/302; G06F 11/07; G06F 3/04895; G06N 20/00; G06Q 20/108
See application file for complete search history.

(56) References Cited

U.S. PATENT DOCUMENTS

| | | | |
|---|---|---|---|
| 8,225,197 B1 | 7/2012 | Szewczyk | |
| 9,665,467 B2 | 5/2017 | Angwin et al. | |
| 9,864,673 B2 | 1/2018 | Michel et al. | |
| 10,162,698 B2 | 12/2018 | Mah et al. | |
| 10,296,717 B2 | 5/2019 | Isaacs | |
| 2007/0131757 A1* | 6/2007 | Hamilton | G06Q 20/1085 235/379 |
| 2015/0134483 A1* | 5/2015 | Barenblatt | G06Q 40/025 705/26.41 |

(Continued)

OTHER PUBLICATIONS

International Search Report and Written Opinion in PCT Appl. No PCT/US2021/032382 dated Aug. 23, 2021, 13 pages.

*Primary Examiner* — Yolanda L Wilson
(74) *Attorney, Agent, or Firm* — Kowert, Hood, Munyon, Rankin & Goetzel, P.C.; Gareth M. Sampson; Dean M. Munyon

(57) ABSTRACT

Techniques are disclosed relating to automatically resolving an error in a user interaction with a user page without the user having to disengage from the user page to resolve the error. A monitoring agent may interface with the user page. The monitoring agent may provide an error signal to an error resolution module in response to detecting an error in the user interaction with the user page. The error resolution module may determine a causal factor for the error based on the error signal and contextual data at the time of the error. A resolution flow may be determined based on the causal factor. The resolution flow may be implemented by the monitoring agent contextually within the user page to resolve the error without the user disengaging from the user page.

20 Claims, 10 Drawing Sheets

(56) References Cited

U.S. PATENT DOCUMENTS

| | | | |
|---|---|---|---|
| 2016/0150044 A1 | 5/2016 | Sze et al. | |
| 2018/0268015 A1* | 9/2018 | Sugaberry | G06Q 10/067 |
| 2019/0087251 A1 | 3/2019 | Purushothaman | |
| 2019/0303258 A1* | 10/2019 | Kumar | G06F 11/3495 |
| 2020/0326537 A1* | 10/2020 | Busey | G02B 27/0101 |
| 2021/0034994 A1* | 2/2021 | Stocker | G06F 16/283 |
| 2021/0157710 A1* | 5/2021 | Alexander | G06F 11/3636 |
| 2021/0158055 A1* | 5/2021 | Khan | G06V 20/36 |
| 2021/0224178 A1* | 7/2021 | Singh | G06F 9/451 |

\* cited by examiner

ERROR RESOLUTION FOR INTERACTIONS WITH USER PAGES

BACKGROUND

Technical Field

This disclosure relates generally to automatically determining and implementing error resolutions in response to errors detected in interactions between users and user pages associated with online systems, according to various embodiments.

Description of the Related Art

When an error occurs during a user interaction with a user page associated with an online system (e.g., a user page associated with a transaction service), the user may have to disengage from the user page (e.g., engage a user page associated with another online system entity) to resolve the error and then return to the original user page to complete the interaction. In some cases, the user may be disengaged and redirected to the other entity by the online system (e.g., the transaction service) itself. The process of engaging with the other online system and then returning to the original user page may, however, be time consuming and reduce user experience satisfaction. Applicant recognizes that determining and implementing error resolution without having the user disengage from the user page associated with the online system may be more efficient and provide a more satisfying user experience.

BRIEF DESCRIPTION OF THE DRAWINGS

The following detailed description makes reference to the accompanying drawings, which are now briefly described.

Figure 1:
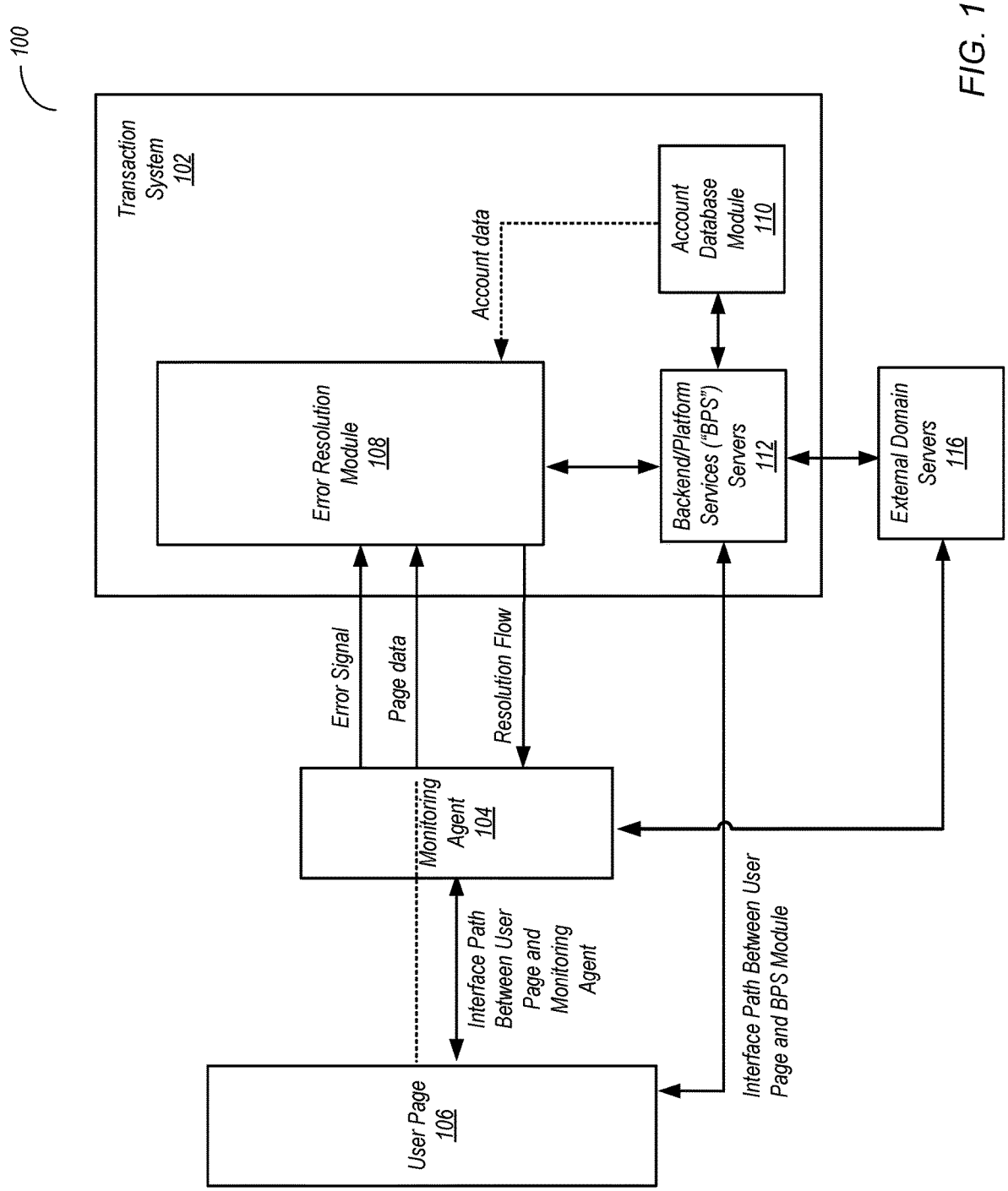
FIG. 1 is a block diagram of a transaction system, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION

The present disclosure is directed to various techniques, including machine learning algorithm techniques, related to automatically detecting and resolving errors that occur during user interactions with user pages associated with online systems such as transaction systems, payment processing systems, social network systems, etc. As used herein, a "user page" is a particular portion of an interface presented to a user. A "user page" may cover a portion (e.g., a window) or an entirety of a display of a user device. User pages may include webpages, such as those associated with access to resources and functionality provided by the online systems, including access to user accounts. For example, user pages may implement user interfaces for users to access users' accounts associated with transaction systems and perform one or more functions related to the accessed accounts. User pages may also include interfaces within applications running on computer systems such as mobile and server computer systems. For example, a user page may be displayed by an application executing on a mobile user device.

In the context of transaction systems, a user may interact with a user page associated with a transaction system, for example, to add or remove account information or to perform a transaction (such as sending money to another person or entity or withdrawing money from an account). Errors may occur during an interaction when, for example, account information is missing or there is an error in the submitted account information, additional documentation is needed, limitations in the user's account are reached, risks are identified with the task, and combinations thereof.

Resolving the errors as quickly and efficiently as possible can provide a better and more satisfactory user experience. In many cases, however, the user is required to disengage from the user page in order to resolve the error. For example, when using a transaction system, the user may have to disengage from the user page associated with the transaction system and contact another online system, such as a bank, to attempt to resolve the error. Resolving the error in this manner is a generic and non-contextual (e.g., not within the context of the user page) experience for the user. Additionally, much of the burden for resolving the error may be placed upon the user when disengagement is required. Such user experiences may be frustrating or unsatisfying for the user, which may result in loss of trust or desire to use the transaction system. With such loss of trust or desire, the transaction system may see resulting losses in revenue due to less use of the transaction system.

The present disclosure contemplates various techniques for automatically detecting an error in an interaction between a user and a user page (for example, based on detecting an error code signal on the user page) and then resolving the error within the context of the user page and without requiring the user to disengage from the user page. One embodiment described herein has two broad components: 1) determining a causal factor for an error related to a user interaction with a transaction system where the causal factor is determined based on the error signal and contextual data at the time of the error (such as user page data or user account data), and 2) implementing a resolution flow in the context of the user page where the resolution flow is based on the causal factor. As used herein, a "causal factor" is a factor that has contributed or is the cause of the error related to the user interaction with the transaction system. For example, the problem that caused the error to occur may include one or more causal factors. As described herein, causal factors may be determined based on contextual data at the time of the error along with an error signal (such as the error code signal from the user page) and then the causal factors may be used to determine resolution flows when correlated to known rules and learned data. Thus, a causal factor may be differentiated from an error code signal on the user page on a basis that the causal factor identifies the factor or problem (e.g., a root cause) that caused the error and that can be addressed to resolve the error while the error code signal identifies only that there is an error of some type.

In embodiments described herein, a monitoring agent may interface with a user page. As used herein, the term "monitoring agent" refers to a listing of commands that are to be executed by a certain program or engine operating on a computer system to monitor and interface with a user page. A monitoring agent may be implemented, for example, as a script, a daemon, or another program or engine interfacing with the user page. The monitoring agent monitors the user page and sends an error signal to the transaction system when the monitoring agent detects an error related to interaction with the user page. In various embodiments, the transaction system implements a machine learning algorithm (e.g., a neural network) to determine a causal factor for the error. In some embodiments, the causal factor is determined based on contextual data at a time of the error. Contextual data may include data from the user page at the time of the error or data for the at least one account of the user associated with the transaction system. In some embodiments, data needed to resolve the error is determined based on the causal factor for the error. The data needed to resolve the error may include, for example, data needed from the user or data needed from an external domain (such as a bank or other entity). In various embodiments, a resolution flow is determined based on the causal factor for the error and implemented by the monitoring agent. The resolution flow may include information used by the monitoring agent to resolve the error. For example, the resolution flow may include instructions to the monitoring agent for resolving the error, scripts or other tools to implement in the user page in resolving the error (such as make requests of the user or provide information about the error), steps to implement in resolving the error, or combinations thereof. The resolution flow may also include information to be implemented in the user page by the monitoring agent such as requests for data from the user or notifications about the error to the user. Implementation of the resolution flow by the monitoring agent interfacing with the user page may provide error resolution for the user without the user having to disengage from the user page. This disclosure also discusses example techniques for training a machine learning algorithm to determine a causal factor.

In short, the present inventors have recognized the benefits of interfacing a monitoring agent with a user page where the monitoring agent detects errors in interactions with the user page and the monitoring agent implements a resolution flow to resolve the error while interfaced with the user page. This approach advantageously allows a user to be able to have the error resolved within the context of the user page and without the user having to disengage from the user page. For example, the error may be resolved with the user providing additional information through the user page or by the transaction system accessing data needed to resolve the error without disengaging the user from the user page. Resolving the error within the context of the user page (as presented to the user) may provide a more efficient and more satisfying user experience with user page of the transaction system.

The present inventors have also recognized the benefits of interfacing a monitoring agent with a user page and implementing a resolution flow using an error resolution module separated from backed/platform services ("BPS", described below) to determine a causal factor and provide error resolution. Utilizing this approach of the monitoring agent and error resolution module allows error resolution to be implemented without having to involve BPS servers directly in the resolution of the error.

FIG. 1 is a block diagram of an example system 100 for automatically determining and implementing error resolutions in response to errors detected in interactions between users and user pages, according to some embodiments. In the embodiment shown in FIG. 1, system 100 includes transaction system 102. As used herein, the term "transaction system" refers to any computer system that implements a service in which two or more parties use computer systems to exchange information. Accordingly, a "transaction service" according to this disclosure may include a payment service (e.g., PAYPAL), a social network, a file transfer service, an online retailer, a dating site, and so on. Note that generally, this disclosure may include various examples and discussion of techniques and structures within the context of a "transaction system". Note that all these examples, techniques, and structures may be generally applicable to any online system that provides user interaction with user accounts associated with the online system. For example, system 100 may be any online system in some instances. However, the term transaction system is used for ease of understanding in various portions of this disclosure.

In the embodiment shown in FIG. 1, transaction system 102 includes monitoring agent 104, user page 106, error resolution module 108, account database module 110, and backend/platform services ("BPS") servers 112. User page 106 may be, as described above, a web page or a page displayed by an application (such as a payment service application) operating on a device (such as a mobile user device). A user may interact with user page 106 to access resources and functionality provided by transaction system 102. In some embodiments, user page 106 implements a user interface for user interaction with transaction system 102. For example, the user may interact with user page 106 to initiate transaction services provided by BPS servers 112, such as to add or remove account information in the user's account on transaction system 102 or to perform a transaction associated with the user's account.

During normal (e.g., "error free" or "happy path") operation, user page 106 interfaces with BPS servers 112 via the "Interface Path". In some embodiments, user page 106 interfaces with BPS servers 112 using one or more APIs ("application programming interfaces"). In certain embodiments, the interface between user page 106 and BPS servers 112 allows the BPS servers to provide functionality for user interactions with the user page. For example, BPS servers 112 may receive information associated with a user transaction from user page 106 (such as information to initiate certain transactions) and the BPS servers may provide information or results corresponding to such transaction for display on the user page. In some embodiments, BPS servers 112 access account database module 110 to provide functionality for the user interactions (e.g., to access user account data, described herein). BPS servers 112 may implement various functions of a payment system through user page 106. For example, BPS servers 112 may implement an application server and/or a web server for the user page, perform transaction services as initiated at the user page, and/or perform auxiliary services associated with such transaction services. Auxiliary services may include risk assessments, merchant services, or other assessments of transactions being attempted by the user through user page 106.

In certain embodiments, monitoring agent 104 interfaces with user page 106. Monitoring agent 104 may be, for example, a script, a daemon, or another program or engine that contextually interfaces with user page 106. In certain embodiments, as a user interacts with user page 106, monitoring agent 104 monitors the user page, such as to detect an error occurrence in the interaction between the user and the user page (e.g., an error code signal on the user page). When the error occurs, monitoring agent 104 detects the error and the monitoring agent provides an error signal to error resolution module 108 in transaction system 102. Monitoring agent 104 may further provide implementation of error resolutions between transaction system 102 and user page 106 (e.g., via instructions or other information provided by error resolution module 108).

In certain embodiments, the interface path between monitoring agent 104 and user page 106 is an independent interface path from the interface path between the user page and BPS servers 112. While the interface path between monitoring agent 104 and user page 106 provides an independent path from BPS servers 112, the monitoring agent is able to provide error detection and error resolution (via error resolution module 108) related to functions implemented by the BPS servers (such as errors in transaction services). In some embodiments, changes in BPS servers 112 (such as changes in functionalities of the BPS servers) are not provided to monitoring agent 104. Monitoring agent 104 may, however, determine the changes in BPS servers 112 based on detection and resolution of errors via the interface path with user page 106. As an example, BPS servers 112 may implement a change in how a user accesses a payment transfer transaction using a new credit card. This change is not provided to monitoring agent 104 or error resolution module 108 but the monitoring agent and error resolution module may determine errors and determine how to resolve errors resulting from the change based on the knowledge base of the monitoring agent and error resolution module, as described herein.

In response to receiving the error signal, error resolution module 108 may determine a causal factor for the error based on the error signal, as described herein. Error resolution module 108, as with other modules described herein, may be implemented as stored executable computer instructions. In certain embodiments, a resolution flow is determined by error resolution module 108 based on the causal factor and the resolution flow is provided to monitoring agent 104. In some embodiments, as described herein, page data (e.g., data from user page 106 at the time of the error) is accessed by error resolution module 108 in response to receiving the error signal from monitoring agent 104 and use in the determination of the causal factor. A resolution flow includes information usable by monitoring agent 104 (such as instructions, scripts or other tools, steps to implement, or combinations thereof as described herein) to resolve an error. In some embodiments, the resolution flow may include information that monitoring agent 104 implements in user page 106 to resolve the error. Providing the resolution flow to monitoring agent 104, which implements information from the resolution flow in user page 106, allows the error to be resolved without redirecting the user away from user page 106. For example, the user does not have to be directed to other user pages to enter or obtain information and the user may be able to resolve the error without having to disengage from user page 106.

In the embodiment of FIG. 1, error resolution module 108 is located in transaction system 102 and is configured to perform various functions related to resolving errors in interactions of users with user page 106. In some embodiments, error resolution module 108 may be located elsewhere in system 100 and coupled to transaction system 102. Error resolution module 108 interfaces, as needed, with monitoring agent 104, account database module 110, BPS servers 112, and external domain servers 116 to obtain data needed to determine and implement the resolution flow.

Figure 2:
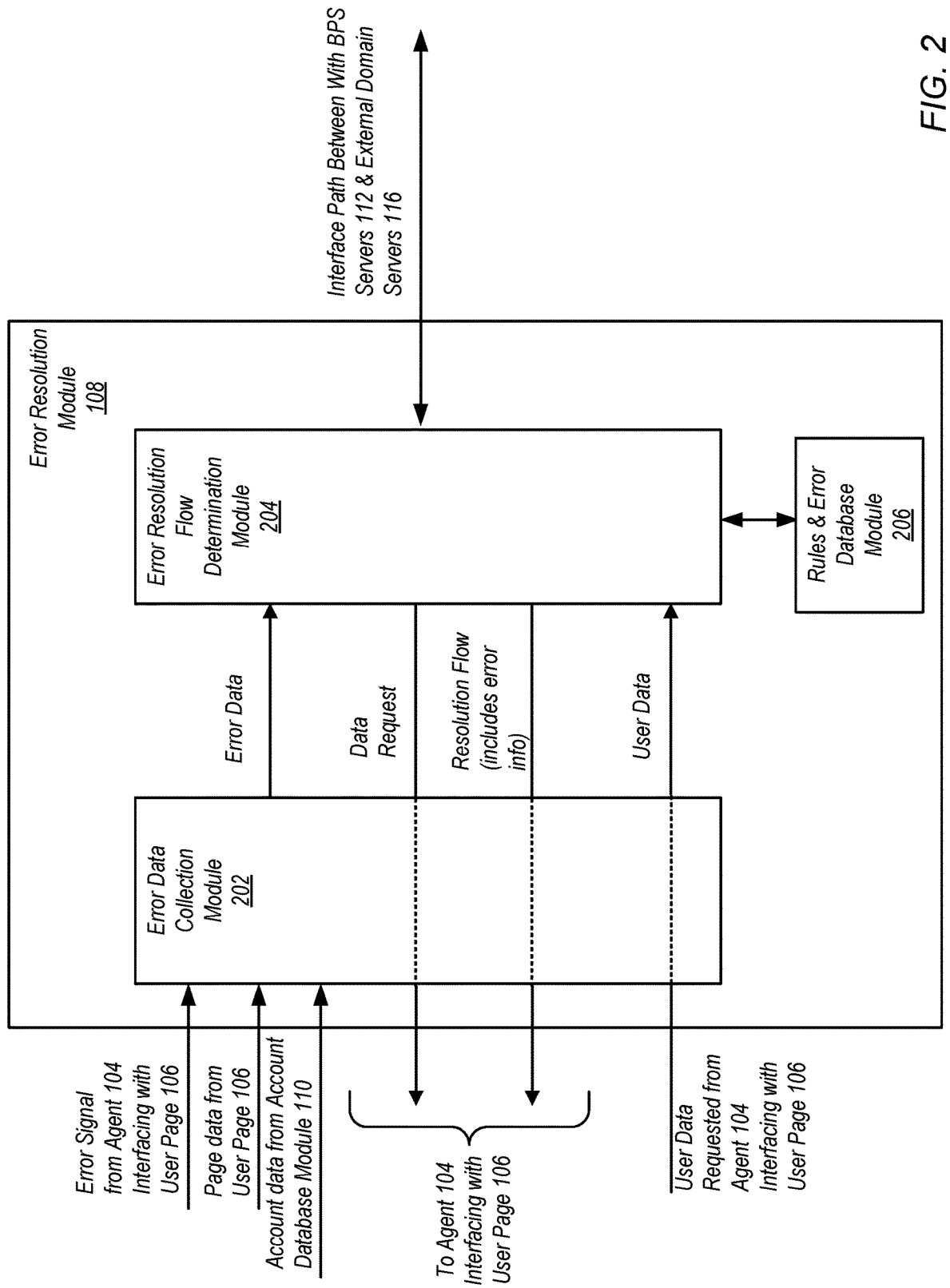
FIG. 2 depicts a block diagram of an error resolution module, according to some embodiments.

FIG. 2 depicts a block diagram of error resolution module 108, according to some embodiments. Error resolution module 108 may include error data collection module 202, error resolution flow determination module 204, and rules and error database module 206. When monitoring agent 104 detects an error, the monitoring agent sends the error signal to error data collection module 202 in error resolution module 108. In response to receiving the error signal, error data collection module 202 may access and collect contextual data (e.g., contextual data items) at the time of the error. In certain embodiments, contextual data includes data from user page 106 at the time of the error. In some embodiments, error data collection module 202 accesses user page 106 directly to collect data. In some embodiments, error data collection module 202 accesses user page 106 through monitoring agent 104. The data collected from user page 106 may include any data present in the user page at the time of the error. For example, the data may include web page data, status information for the user page, screenshots of the user page, error code information, etc. In some embodiments, the data collected from user page 106 includes data from time periods before or after the time of the error.

In certain embodiments, contextual data collected by error data collection module 202 includes account data for the user's account accessed from account database module 110. Account data may include any information pertaining to the user's account in system 100. Examples of account data include, but are not limited to, bank account data, credit card data, personal data, and security protocol data. The error data collected by error data collection module 202 may be provided to error resolution flow determination module 204, as shown in FIG. 2.

Figure 3:
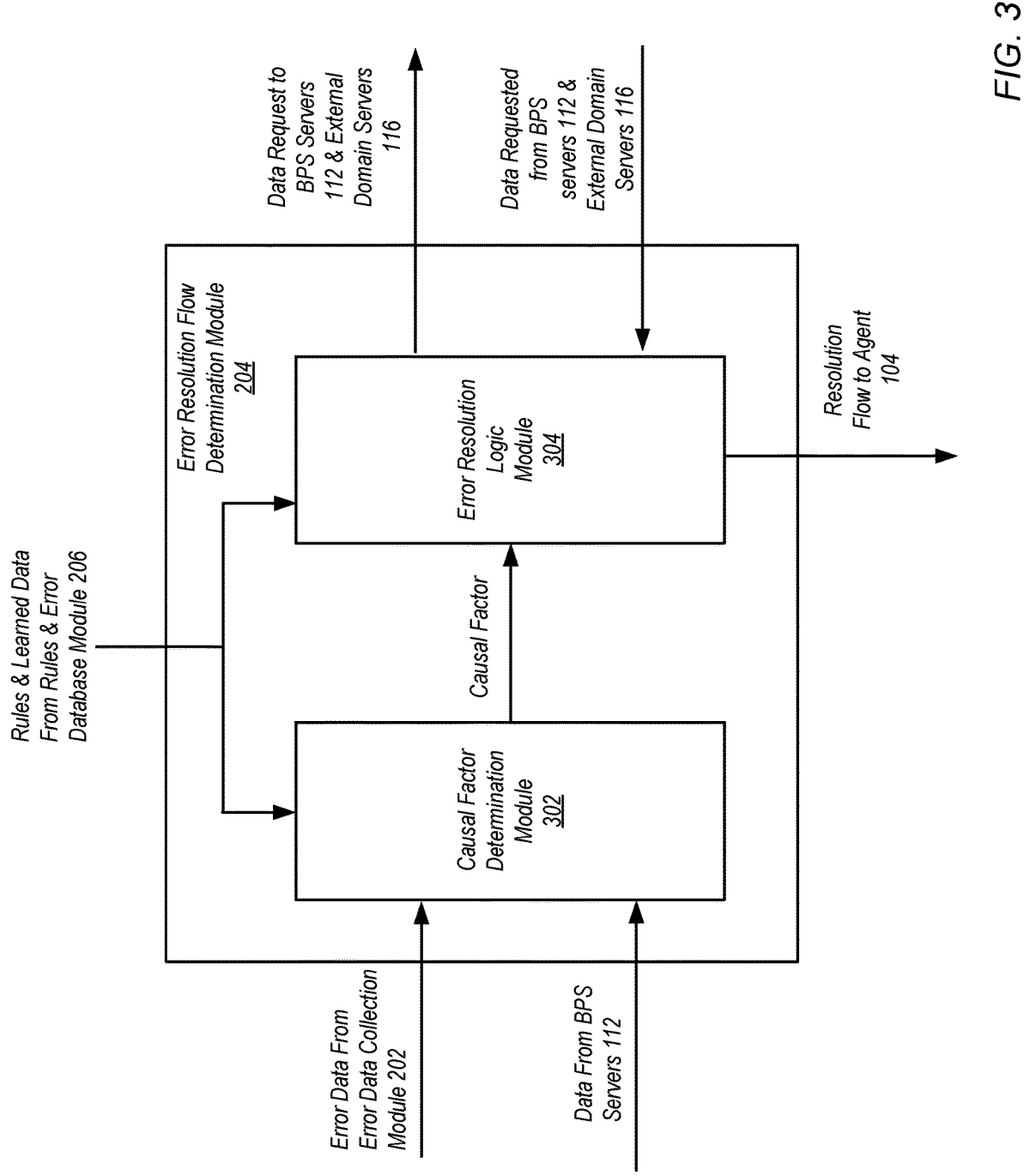
FIG. 3 depicts a block diagram of an error resolution flow determination module, according to some embodiments.

FIG. 3 depicts a block diagram of error resolution flow determination module 204, according to some embodiments. Error resolution flow determination module 204 may include causal factor determination module 302 and error resolution logic module 304. Error resolution flow determination module 204 determines the resolution flow based on receiving the error data from error data collection module 202. In some embodiments, determining the resolution flow includes determining a causal factor for the error based on the received error data, determining the data needed to resolve the error, and generating the resolution flow, as described herein.

In certain embodiments, causal factor determination module 302 determines a causal factor for the error in response to receiving error data from error data collection module 202. For example, the causal factor for the error may be determined by causal factor determination module 302 based on the error signal and the contextual data provided in the error data. In some embodiments, causal factor determination module 302 determines the causal factor based on rules-based analysis of the error signal and the contextual data. For example, causal factor determination module 302 may apply rules coded in the module, rules accessed from rules and error database module 206, rules accessed from another database, or combinations thereof. The rules may be applied by causal factor determination module 302 to determine the causal factor based on the error signal and the contextual data.

In certain embodiments, causal factor determination module 302 implements machine learning algorithms (e.g., neural networks) to determine the causal factor for the error. Machine learning algorithms may include any combination of hardware or software (e.g., program instructions) located in causal factor determination module 302. In certain embodiments, the machine learning algorithms are implemented as neural networks.

In some embodiments, the machine learning algorithms include classification algorithms. With classification algorithms, error data may be input as tabular data that is classified to determine an output (e.g., causal factors or probabilities of causal factors). In some embodiments, the machine learning algorithms include image-based learning algorithms. Image-based learning algorithms utilize data in image formats as input to the learning algorithms to assess features of the data. For image-based learning algorithms, error data may be input, for example, as screenshots or other images. Image-based learning algorithms may include computer vision algorithms or image-based machine learning algorithms that assess image input to gain a high level of understanding of the image input and provide decisions (e.g., the causal factor) based on that understanding. One example of an image-based learning algorithm is a deep convolutional neural network (DCNN) though other image-based learning algorithms may also be contemplated as the disclosure may not be limited to these particular examples.

In certain embodiments, causal factor determination module 302 is a trained machine learning module, as described herein, where the module has been trained to classify error data input to provide the desired output (e.g., the causal factor). Causal factor determination module 302 may, for example, include machine learning circuitry installed or configured with operating parameters that have been learned by the machine learning module itself or a similar machine learning module (e.g., a machine learning module operating on a different processor or device). For example, causal factor determination module 302 may be trained using training data (e.g., reference data) to generate operating parameters for the machine learning circuitry, as described in the embodiment of FIG. 8 herein. The operating parameters generated from the training may then be used to operate causal factor determination module 302 (or used on another similar machine learning module).

As shown in FIG. 3, causal factor determination module 302 outputs the causal factor for the error to error resolution logic module 304. The causal factor may be output as a parameter that is correlated to a database of rules and learned data by error resolution logic module 304. In certain embodiments, error resolution logic module 304 accesses rules and learned data that correlate to the causal factor from rules and error database module 206. Rules and error database module 206 may include a database of rules (e.g., relational rules) and learned data (e.g., learned resolution flows) that is generated based on knowledge of errors and the steps taken to resolve the errors. The knowledge may include, for example, knowledge learned from previous error resolving operations provided by error resolution module 108 or error resolving operations provided by other services (such as error resolution centers). In some embodiments, rules and error database module 206 is capable of adding additional knowledge while implemented in system 100. For example, error resolution flow determination module 204 may gain and store knowledge in rules and error database module 206 from previous operations of determining error resolution flows or knowledge gained from other services (such as other error resolution modules or other error resolution services).

In certain embodiments, error resolution logic module 304 determines data needed to resolve the error and a resolution flow to resolve the error by accessing rules and error database module 206. For example, rules and error database module 206 may include data mapping (e.g., a lookup table) of rules and learned data. The data mapping may be used to determine rules and learned data to be accessed by error resolution logic module 304 based on correlation to the input causal factor. The rules and learned data accessed based on the correlation may then be used by error resolution logic module 304 to determine the data needed to resolve the error and the resolution flow to resolve the error.

In certain embodiments, the data needed to resolve the error is determined based on rules accessed from rules and error database module 206. For example, one or more rules accessed based on correlation to the input causal factor may determine the data that is needed to resolve the error. Data needed to resolve the error may include data to be requested from the user (via monitoring agent 104, as described herein) or data to be requested from BPS servers 112 or external domain servers 116. Data to be requested from the user may include, but not be limited to, personal data, account data, documents, evidentiary data, or other data that can only be obtained from the user. Data to be requested from BPS servers 112 may include, but not be limited to, web server data, transaction service data, and auxiliary service data (such as risk assessment data). Data to be requested from external domain servers (via interface with BPS servers 112, as shown in FIG. 1) may include, but not be limited to, account data for the user on the external domain servers (such as bank account or financial account data).

In certain embodiments, after determining data to be requested from BPS servers 112 or external domain servers 116, error resolution logic module 304 may send requests for the data needed to BPS servers 112 or external domain servers 116. In some embodiments, data requested from BPS servers 112 or external domain servers 116 is received by error resolution logic module 304, as shown in FIG. 3. Error resolution logic module 304 may then, in some embodiments, use the provided data to determine the resolution flow, as described below. In some embodiments, data requested from external domain servers 116 is received directly by monitoring agent 104, as shown by the direct path between the monitoring agent and external domain servers in FIG. 1. Monitoring agent 104 may then implement the resolution flow using the data, as described herein.

In certain embodiments, the resolution flow is determined by error resolution logic module 304 by accessing learned data (e.g., learned resolution flows) from rules and error database module 206. In some embodiments, learned resolution flows are accessed based on the causal factor and the data received by error resolution logic module 304 from BPS servers 112 or external domain servers 116. For example, error resolution logic module 304 may receive the data from BPS servers 112 or external domain servers 116 and use the received data in combination with the causal factor to determine the learned resolution flow(s) to access from rules and error database module 206. Error resolution logic module 304 may then determine the resolution flow to provide to monitoring agent 104 based on the accessed learned resolution flows. In such embodiments, error resolution logic module 304 may also send the received data to monitoring agent 104 in addition to the resolution flow. In some embodiments, the data from BPS servers 112 or external domain servers 116 is provided directly to monitoring agent 104 (e.g., the data is sent to both error resolution logic module 304 and monitoring agent 104 in response to the request from the error resolution logic module).

In some embodiments, learned data (e.g., learned resolution flows) are accessed based only on the causal factor. For example, error resolution logic module 304 may access learned resolution flow(s) based on their correlation to the input causal factor. Error resolution logic module 304 may then determine the resolution flow to provide to monitoring agent 104 based on the accessed learned resolution flows. In such embodiments, the resolution flow to be provided to monitoring agent 104 may be determined based only on the accessed learned resolution flows or may be determined based on the accessed learned resolution flows and, if needed, data received from BPS servers 112 or external domain servers 116.

In certain embodiments, as described above, Data needed to resolve the error determined by error resolution logic module 304 may include data to be requested from the user (via monitoring agent 104). In some embodiments, the request for data from the user is provided to monitoring agent 104 separately from the resolution flow (as shown in FIG. 2). In some embodiments, the request for data from the user is included in the resolution flow. In such embodiments, the request for data is included in the information to be implemented in user page 106 by monitoring agent 104.

Returning to FIG. 1, the resolution flow includes information usable by monitoring agent 104 to resolve the error, including information to be implemented in user page 106. In certain embodiments, the information in the resolution flow usable by monitoring agent 104 to resolve the error is based on receiving data needed to resolve the error. The data needed to resolve the error may include, for example, data needing to be requested from the user (with the request implemented by monitoring agent 104) or data requested from external domain servers 116, which can be received in the monitoring agent through the various methods described above. In some embodiments, data requested from the user by implementing a request in user page 106 with monitoring agent 104 is received directly from the user page (after submission by the user) by the monitoring agent. The request and receiving of the data requested data from the user may be implemented via the interface path between monitoring agent 104. In some embodiments, the data requested from the user may be sent by monitoring agent 104 to error resolution module 108 (as shown in FIG. 2) before being sent back to the monitoring agent. In situations where the data requested is sent by monitoring agent 104 to error resolution module 108, the error resolution module may process or implement the data requested in determining the resolution flow (as with data from external domain servers 116) before returning the data back to the monitoring agent. The data may be returned back to monitoring agent 104 as part of the resolution flow or using another interface path between the monitoring agent and error resolution module 108.

In some embodiments, the resolution flow includes information about the error for display in user page 106. For example, the information about the error for display in user page 106 may include information such as, but not limited to, a notification about the content or properties of the error, a notification of the cause of the error, and a notification of steps to be taken for resolving the error (e.g., a list of steps to be taken as part of the resolution flow). The information about the error for display in user page 106 may also include information for interfaces with the user to be implemented in the user page (e.g., user interface elements to be implemented in the user page). The information about the error for display in user page 106 may be included in the information to be implemented in the user page, as described herein.

As shown in FIG. 1, the resolution flow is provided by error resolution module 108 to monitoring agent 104, which interfaces with user page 106. As monitoring agent 104 interfaces with user page 106, the monitoring agent is able to implement the resolution flow received from error resolution module 108 into the user page. Implementing of the resolution flow in user page 106 may include, for example, displaying of information about the error in the user page, displaying of steps to resolve the error in the user page, requesting data from the user in the user page, and displaying or requesting other information as described herein. In certain embodiments, monitoring agent 104 implements portions of the resolution flow contextually within user page 106. For example, monitoring agent 104 may implement scripts, widgets, or other tools via the interface with user page 106 to display instructions, steps, or other information from the resolution flow on the user page. In some embodiments, monitoring agent 104 may implement scripts, widgets, or other tools via the interface with user page 106 to request information or data from the user and process the request. Implementing the resolution flow contextually within user page 106 allows monitoring agent 104 to implement the resolution flow (e.g., the steps in the resolution flow) without redirecting the user to another user page (such as another web page associated with external domain servers 116).

Figure 4:
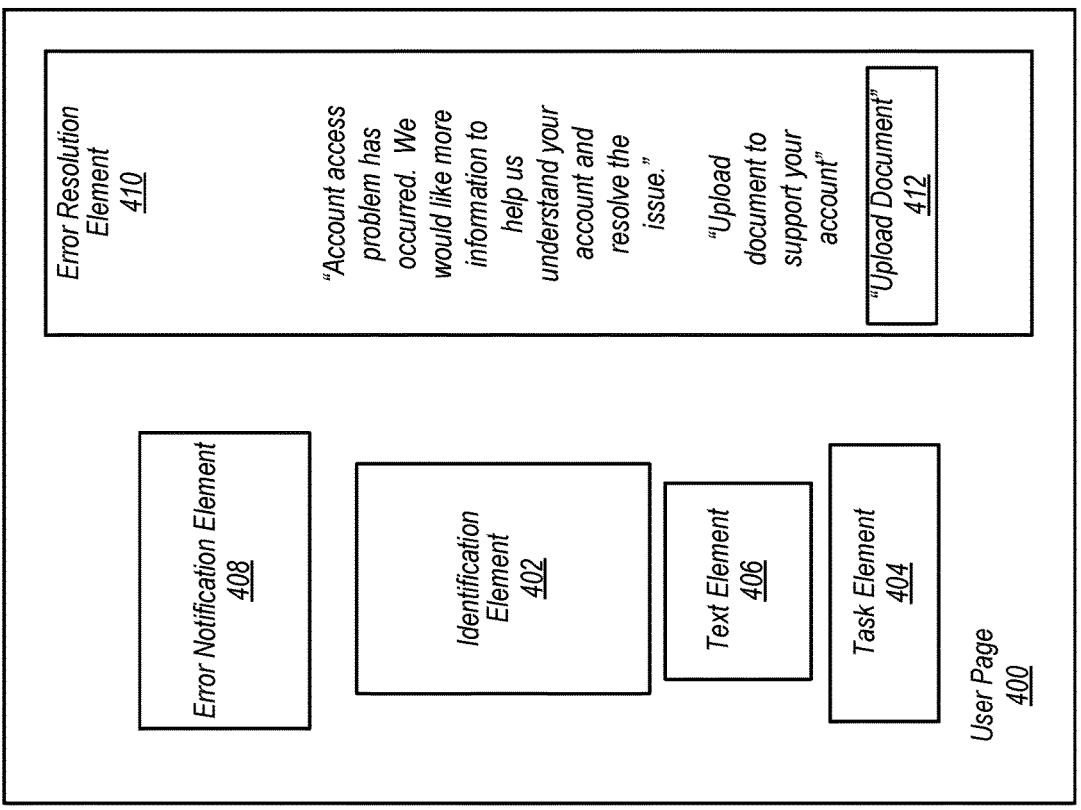

FIGS. 4-7 depict examples of a user page with a resolution flow implemented contextually in the user page. As shown in FIG. 4, user page 400, which is provided as an example of user page 106, shown in FIG. 1, may include multiple user interface elements such as identification elements 402, task elements 404, and text elements 406. Identification elements 402 may include, for example, elements that identify account information or identify other information corresponding to the task being attempted by the user during interaction with user page 400. Task elements 404 may include, for example, interactive elements to activate tasks being attempted by the user. Text elements 406 may include text being displayed to the user based on the interaction. For instance, in the example of FIGS. 4-7, the user is attempting to remove a bank account from the user's account in the transaction system and text elements 406 display text corresponding to task element 404, which activates the attempt to remove the bank account. In some embodiments, user page 400 includes error notification element 408. Error notification element 408 may be provided by user page 400 in response to an error occurring in the interaction (e.g., a notification of an error code signal).

In FIG. 4, the error in the interaction between the user and user page 400 has occurred. In response to the error occurring, monitoring agent 104 implements contextual error resolution element 410 in user page 400. Element 410 displays information implemented by monitoring agent 104 based on the resolution flow provided to the monitoring agent from error resolution module 108. For instance, in the current example, element 410 includes a display that "Account access problem has occurred. We would like more information to help us understand your account and resolve the issue." and a request for a document to provide more information about the user's account ("Upload document to support your account") with corresponding "Upload document" task element 412.

Figure 5:
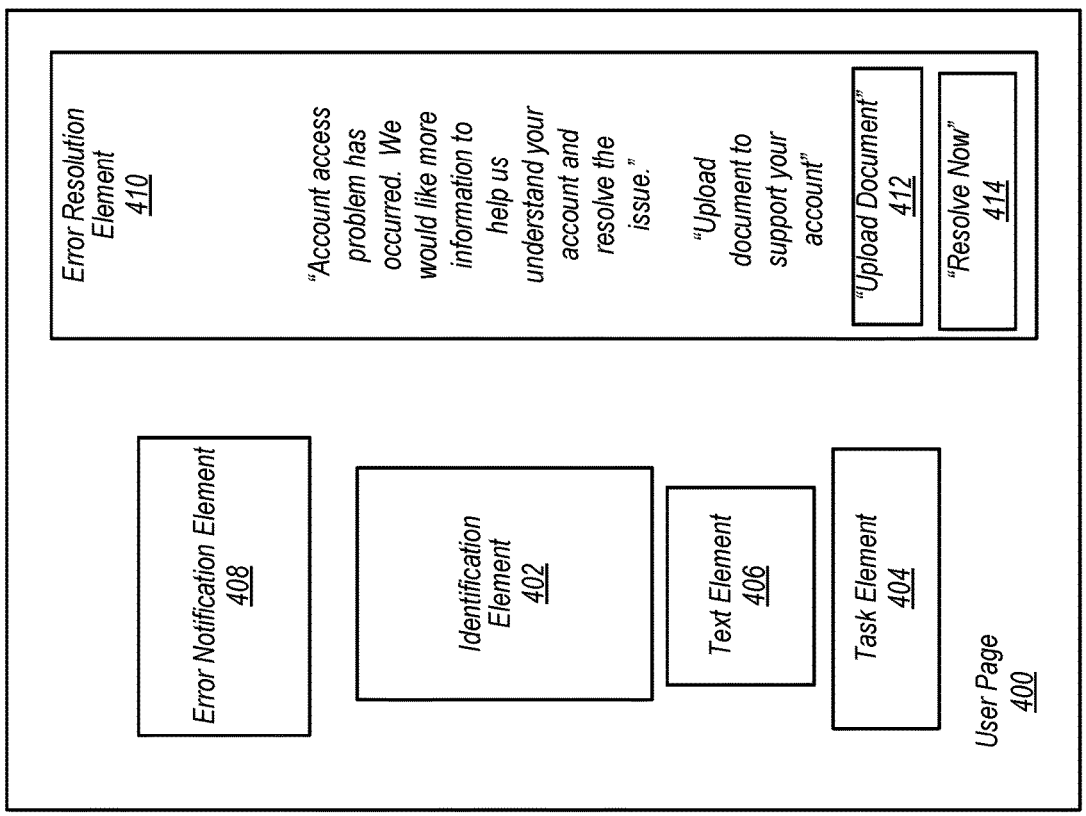
FIGS. 4-7 depict examples of a user page with a resolution flow implemented contextually in the user page.
Figure 7:
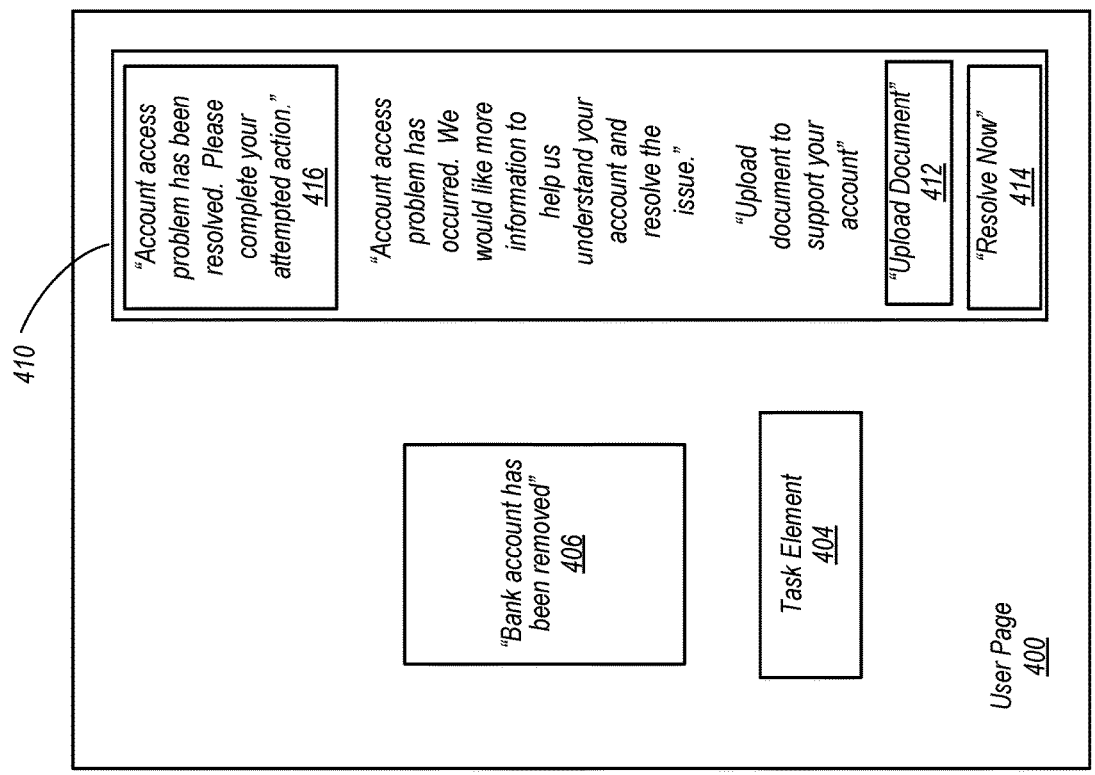
Figure 6:
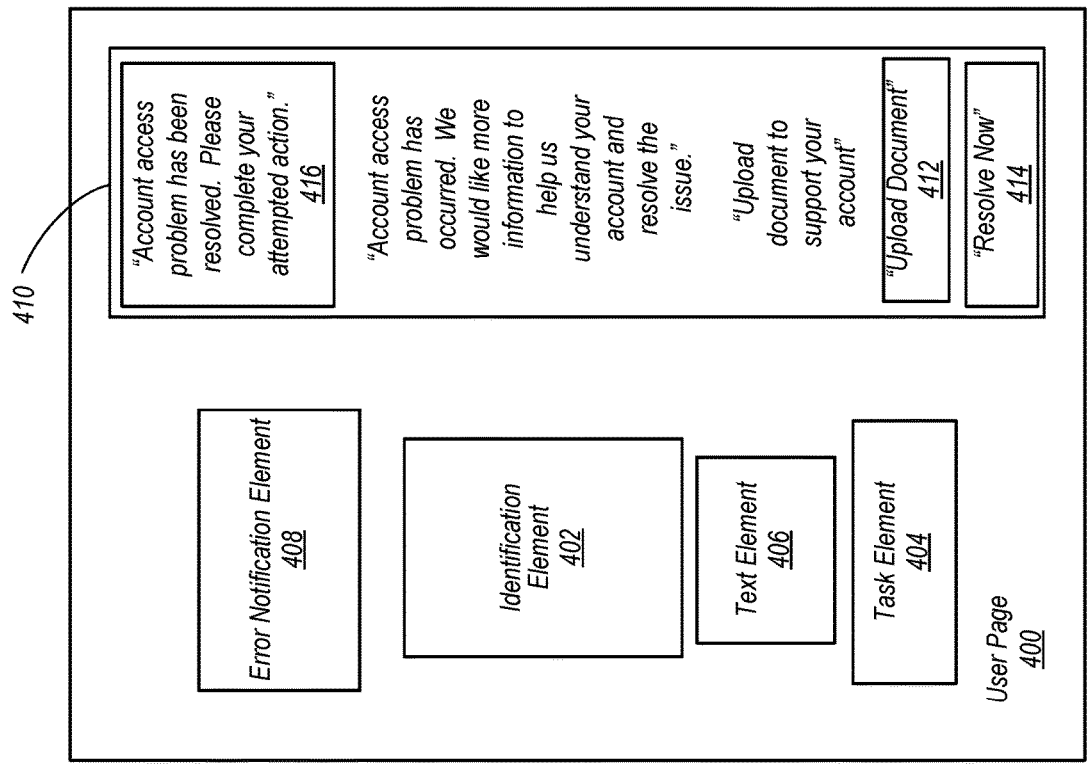

In FIG. 5, element 410 is updated when the user uploads the requested document via user page 400. The update provides task element 414, which displays as "Resolve Now" to proceed with attempting to resolve the error according to the resolution flow. In FIG. 6, element 410 is updated with notification element 416 stating that "Account access problem has been resolved. Please complete your attempted action." Completing the attempted action includes the user returning to the original task in user page 400 in attempting to remove the bank account. At this time, the user may activate task element 404 again to complete the attempt. In FIG. 7, text element 406 changes to indicate that the task has been completed (e.g., "Bank account has been removed"). Additionally, task element 404 may be updated to a task to end the process and, for example, return to a home page.

FIGS. 4-7 provide an example of an error in the interaction of a user with user page 400 being resolved without the user having to disengage from the user page (e.g., redirect to another user page). It is to be understood that FIGS. 4-7 are non-limiting, and that techniques for error resolution described herein may be applied in many different instances. Additional embodiments for resolving an error in the interaction of a user with a user page may be contemplated based on the description herein. Such additional embodiments may include monitoring agent 104 implementing a resolution flow in the user page (where the resolution flow is determined by error resolution module 108) in a similar manner to the current example depicted in FIGS. 4-7.

Figure 8:
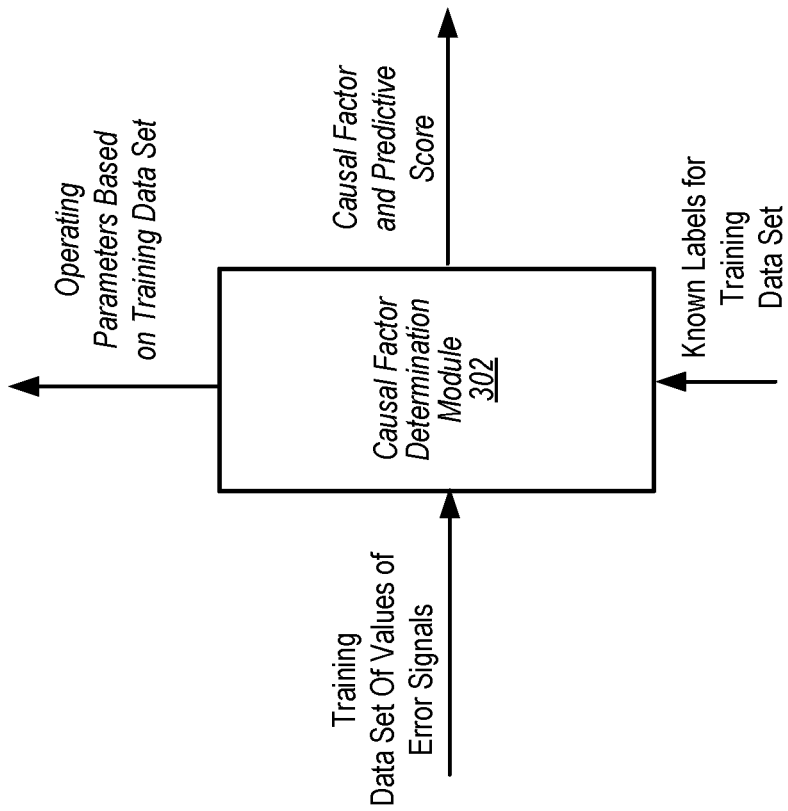
FIG. 8 depicts a block diagram illustrating a system configured to train a machine learning module, according to some embodiments.

FIG. 8 depicts a block diagram illustrating a system configured to train causal factor determination module 302, according to some embodiments. In certain embodiments, causal factor determination module is trained as a machine learning module. A training data set that indicates values of error signals may be provided to causal factor determination module. The training data set may include values of other data in addition to the values of the error signals. For example, the training data set may include values of data from user pages, data from user accounts, data from external domain services accounts, or other data corresponding to data accessed by causal factor determination module 302 as described herein. In certain embodiments, the training data set is selected to train causal factor determination module 302 to determine a particular causal factor. Thus, each different type of causal factor may have its own corresponding training data set. The training data set may be in a format substantially similar to the error data provided by error data collection module 202 (shown in FIG. 2). The values in the training data set may correspond to one or more classification categories associated with causal factor determination module 302.

As shown in FIG. 8, known labels for the training data set may also be provided to causal factor determination module. The known labels may include labels of known information that correspond to one or more subsets of the training data set. Thus, for a training data set for a particular error signal, the known labels include labels selected based on the information that causal factor determination module 302 is attempting to generate a causal factor for the error that has a predictive score (described below). For example, for a financial transaction service, causal factor determination module 302 may be trained to predict a causal factor that corresponds to a particular error in a user interaction with a user page for the transaction service.

Based on the input of the training data set and the known labels, causal factor determination module 302 can then be trained to generate a causal factor with a predictive score for the causal factor. The predictive score may be a score that indicates a probability (e.g. a score ranging from 0-100 or some other range) that the generated causal factor corresponds to the error in the training data set. In certain embodiments, training of causal factor determination module 302 includes optimization of operating parameters (e.g. classifiers) used in the machine learning module to generate the causal factor with the predictive score. A score may be provided on the known labels input into causal factor determination module 302. Causal factor determination module 302 may then be optimized by determining operating parameters that generate a predictive score that is as close to the score input on the known labels as possible. The operating parameters for the training data set may then be used to operate causal factor determination module 302, as shown in FIG. 3.

Example Methods

Figure 9:
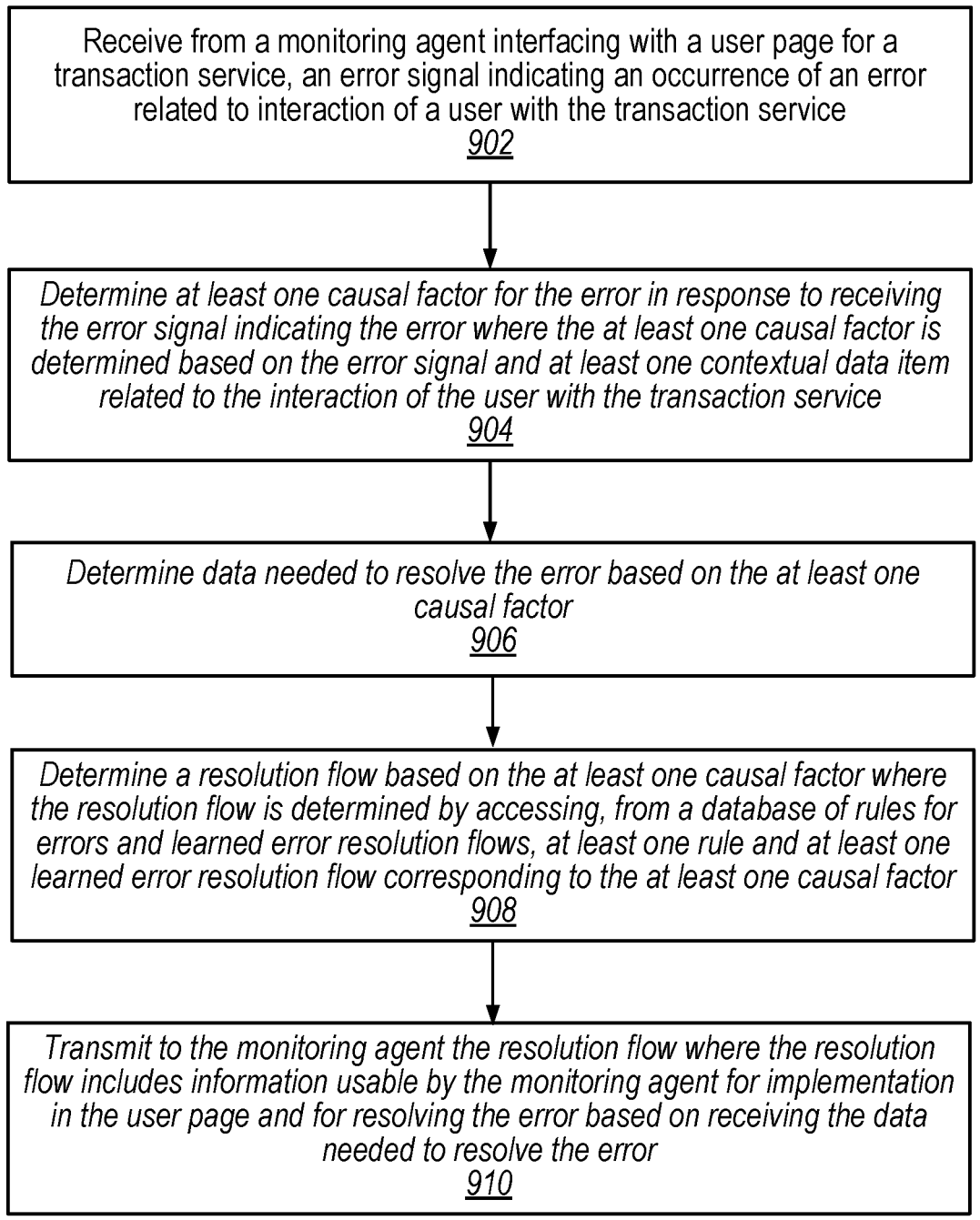
FIG. 9 is a flow diagram illustrating a method for determining a causal factor in response to an error in an interaction of a user with a user page and transmitting a resolution flow to a monitoring agent interfacing with the user page, according to some embodiments.

FIG. 9 is a flow diagram illustrating a method for determining a causal factor in response to an error in an interaction of a user with a user page and transmitting a resolution flow to a monitoring agent interfacing with the user page, according to some embodiments. The method shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system.

At 902, in the illustrated embodiment, a computing system receives from a monitoring agent interfacing with a user page for a transaction service, an error signal indicating an occurrence of an error related to interaction of a user with the transaction service.

At 904, in the illustrated embodiment, the computing system determines at least one causal factor for the error in response to receiving the error signal indicating the error where the at least one causal factor is determined based on the error signal and at least one contextual data item related to the interaction of the user with the transaction service. In some embodiments, the at least one contextual data item includes data from the user page at a time of the error and data for at least one account of the user associated with the transaction service. In some embodiments, the at least one causal factor is determined by providing the error signal and the at least one contextual data item to a machine learning algorithm. In some embodiments, the at least one contextual data item includes one or more screenshots of the user page at a time of the error where the at least one causal factor is determined by providing the error signal and the screenshots of the user page to an image-based learning algorithm At 906, in the illustrated embodiment, the computing system determines data needed to resolve the error based on the at least one causal factor. In some embodiments, determining the data needed to resolve the error based on the at least one causal factor includes accessing, from the database of rules for errors and learned error resolution flows, at least one rule corresponding to the at least one causal factor.

At 908, in the illustrated embodiment, the computing system determines a resolution flow based on the at least one causal factor where the resolution flow is determined by accessing, from a database of rules for errors and learned error resolution flows, at least one rule and at least one learned error resolution flow corresponding to the at least one causal factor. In some embodiments, the resolution flow includes information usable by the monitoring agent to resolve the error without redirecting the user to another user page. In some embodiments, the resolution flow includes information usable by the monitoring agent to display information about the error on the user page.

At 910, in the illustrated embodiment, the computing system transmits to the monitoring agent the resolution flow where the resolution flow includes information usable by the monitoring agent for implementation in the user page and for resolving the error based on receiving the data needed to resolve the error.

In some embodiments, the computing system receives at least some data needed to resolve the error from at least one external domain where the resolution flow is determined by accessing, from the database of rules for errors and learned error resolution flows, at least one learned error resolution flow corresponding to the at least one causal factor and the at least some data received from the at least one external domain. In some embodiments, the data needed to resolve the error includes data needed from the user to resolve the error where the resolution flow includes information usable by the monitoring agent to implement a request in the user page for the data needed from the user to resolve the error.

In some embodiments, the computing system receives data provided by the user corresponding to the request for the data needed from the user to resolve the error and resolves the error related to the interaction of the user corresponding to the resolution flow based on, at least in part, the received data provided by the user.

Figure 10:
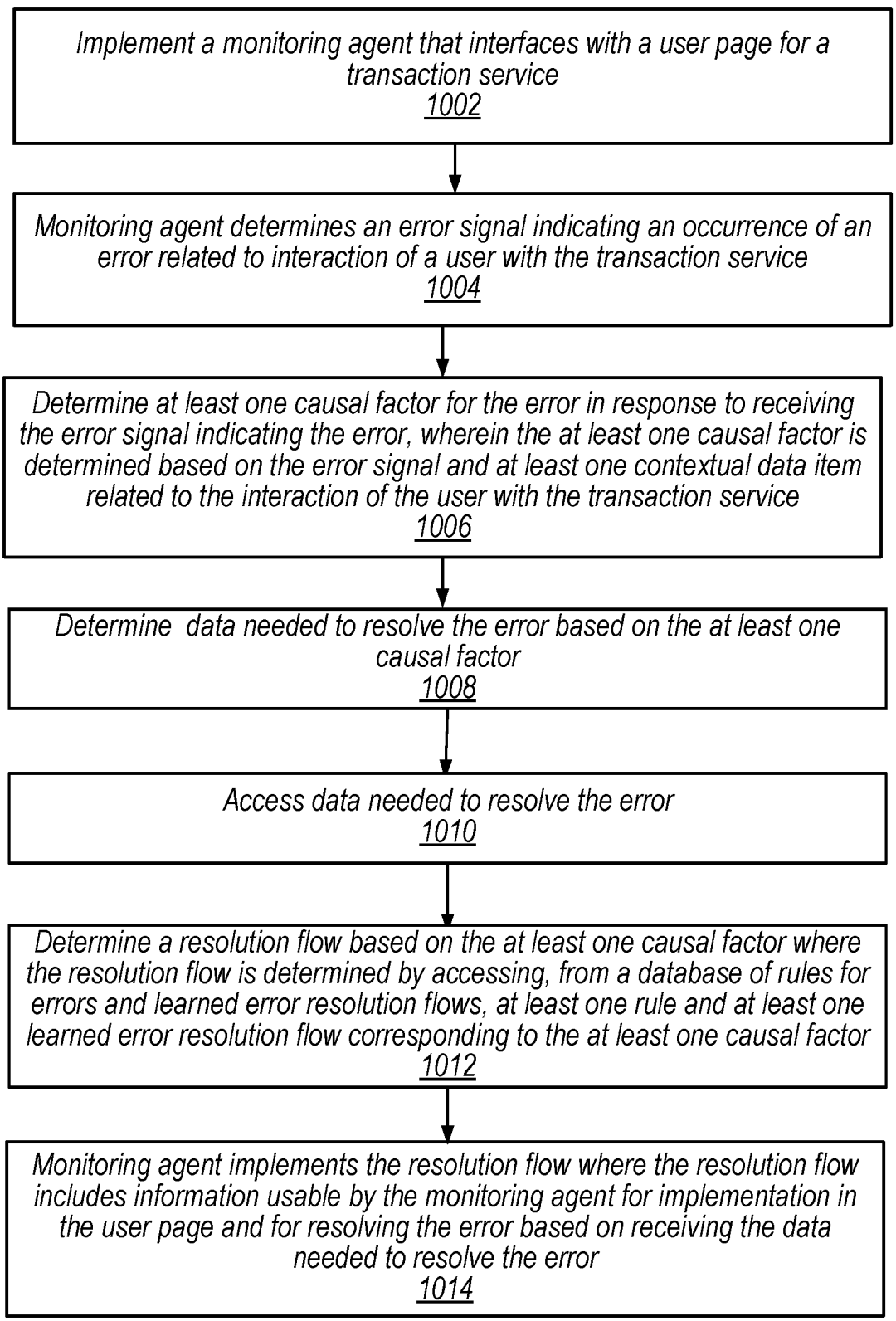
FIG. 10 is a flow diagram illustrating a method for implementing a monitoring agent that interfaces with a user page, determining a causal factor in response to an error in an interaction of a user with a user page detected by the monitoring agent, and implementing a resolution flow to resolve the error using the monitoring agent, according to some embodiments.

FIG. 10 is a flow diagram illustrating a method for implementing a monitoring agent that interfaces with a user page, determining a causal factor in response to an error in an interaction of a user with a user page detected by the monitoring agent, and implementing a resolution flow to resolve the error using the monitoring agent, according to some embodiments. The method shown in FIG. 10 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system.

At 1002, in the illustrated embodiment, a computing system implements a monitoring agent that interfaces with a user page for a transaction service.

At 1004, in the illustrated embodiment, the monitoring agent determines an error signal indicating an occurrence of an error related to interaction of a user with the transaction service.

At 1006, in the illustrated embodiment, the computing system determines at least one causal factor for the error in response to receiving the error signal indicating the error, wherein the at least one causal factor is determined based on the error signal and at least one contextual data item related to the interaction of the user with the transaction service. In some embodiments, the at least one contextual data item includes data from the user page at a time of the error and data for at least one account of the user associated with the transaction service.

At 1008, in the illustrated embodiment, the computing system determines data needed to resolve the error based on the at least one causal factor.

At 1010, in the illustrated embodiment, the computing system accesses data needed to resolve the error. In some embodiments, accessing the data needed to resolve the error includes implementing in the user page, by the monitoring agent, a request for data needed from the user to resolve the error. In some embodiments, accessing the data needed to resolve the error includes interfacing with at least one external domain to access data needed to resolve the error.

At 1012, in the illustrated embodiment, the computing system determines a resolution flow based on the at least one causal factor where the resolution flow is determined by accessing, from a database of rules for errors and learned error resolution flows, at least one rule and at least one learned error resolution flow corresponding to the at least one causal factor.

At 1014, in the illustrated embodiment, the resolution flow is implemented by the monitoring agent where the resolution flow includes information usable by the monitoring agent for implementation in the user page and for resolving the error based on receiving the data needed to resolve the error.

In some embodiments, the computing system resolves the error related to the user interaction corresponding to the resolution flow. In some embodiments, resolving the error includes resolving the error through the interface of the monitoring agent with the user page without disengaging the user from the user page.

Figure 11:
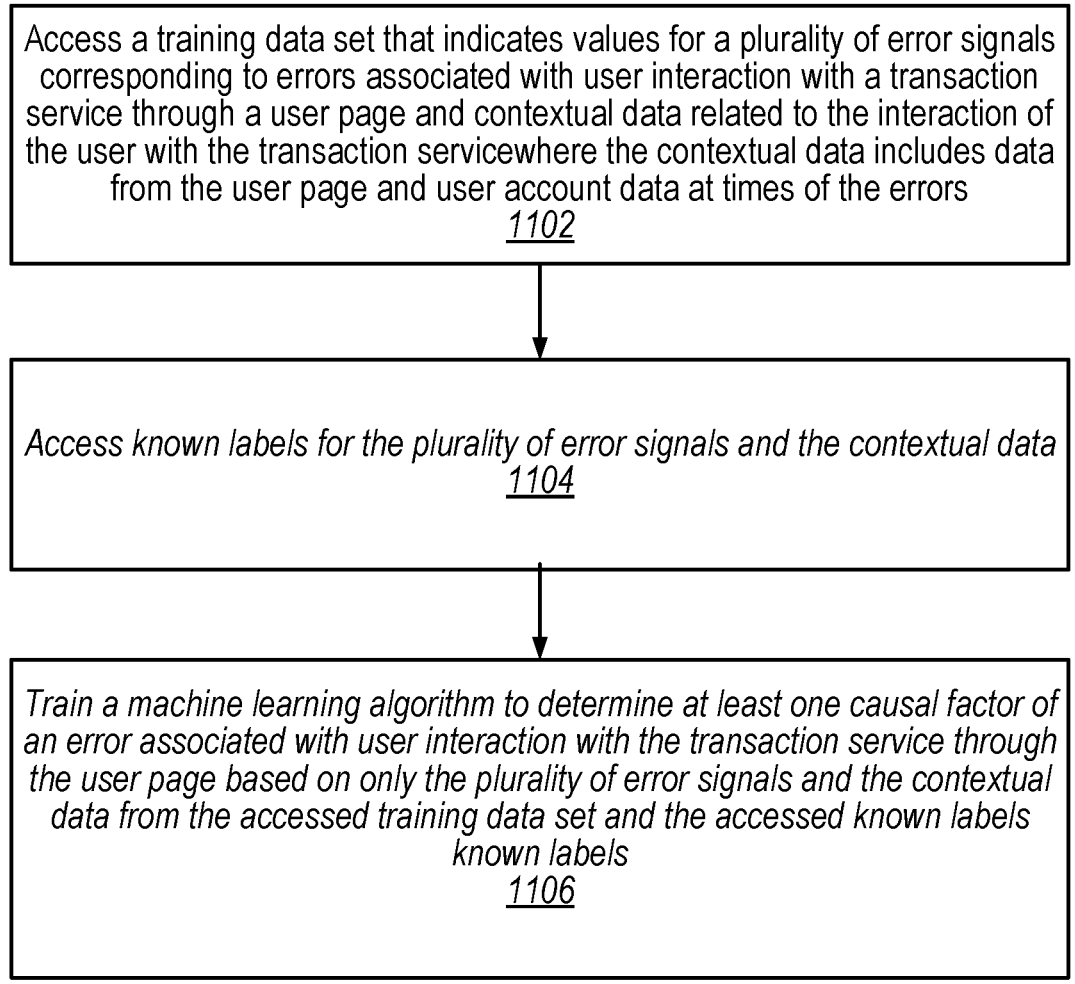
FIG. 11 is a flow diagram illustrating a method for training a machine learning module to determine a causal factor, according to some embodiments.

FIG. 11 is a flow diagram illustrating a method for training a machine learning module to determine a causal factor, according to some embodiments. The method shown in FIG. 11 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system.

At 1102, in the illustrated embodiment, a computing system accesses a training data set that indicates values for a plurality of error signals corresponding to errors associated with user interaction with a transaction service through a user page and contextual data related to the interaction of the user with the transaction service where the contextual data includes data from the user page and user account data at times of the errors.

At 1104, in the illustrated embodiment, the computing system accesses known labels for the plurality of error signals and the contextual data.

At 1106, in the illustrated embodiment, the computing system trains a machine learning algorithm to determine at least one causal factor of an error associated with user interaction with the transaction service through the user page based on only the plurality of error signals and the contextual data from the accessed training data set and the accessed known labels. In some embodiments, training the machine learning algorithm includes training the machine learning algorithm to generate a predictive score for the at least one causal factor. In some embodiments, training the machine learning algorithm includes generating operating parameters to be implemented in the machine learning algorithm to determine the at least one causal factor.

Example Computer System

Figure 12:
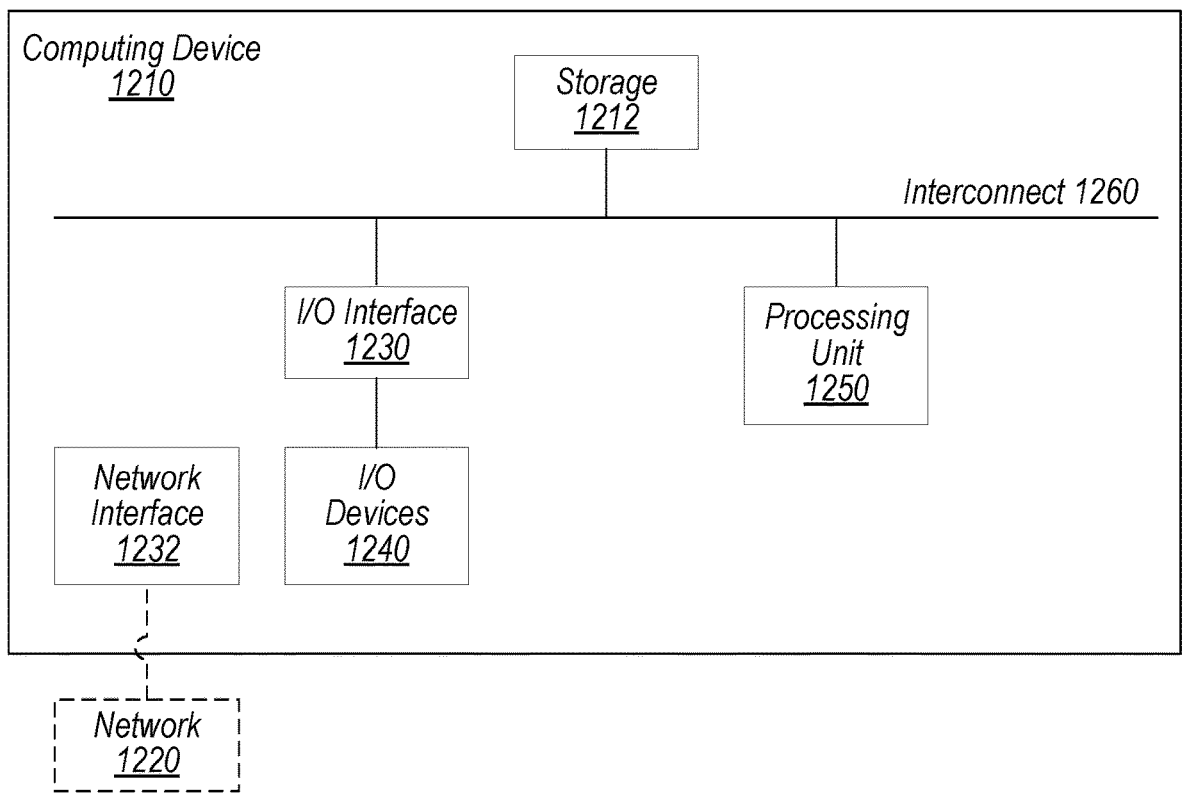
FIG. 12 is a block diagram of one embodiment of a computer system.

Turning now to FIG. 12, a block diagram of one embodiment of computing device (which may also be referred to as a computing system) 1210 is depicted. Computing device 1210 may be used to implement various portions of this disclosure. Computing device 1210 may be any suitable type of device, including, but not limited to, a personal computer system, desktop computer, laptop or notebook computer, mainframe computer system, web server, workstation, or network computer. As shown, computing device 1210 includes processing unit 1250, storage subsystem 1212, and input/output (I/O) interface 1230 coupled via an interconnect 1260 (e.g., a system bus). I/O interface 1230 may be coupled to one or more I/O devices 1240. Computing device 1210 further includes network interface 1232, which may be coupled to network 1220 for communications with, for example, other computing devices.

In various embodiments, processing unit 1250 includes one or more processors. In some embodiments, processing unit 1250 includes one or more coprocessor units. In some embodiments, multiple instances of processing unit 1250 may be coupled to interconnect 1260. Processing unit 1250 (or each processor within 1250) may contain a cache or other form of on-board memory. In some embodiments, processing unit 1250 may be implemented as a general-purpose processing unit, and in other embodiments it may be implemented as a special purpose processing unit (e.g., an ASIC). In general, computing device 1210 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage subsystem 1212 is usable by processing unit 1250 (e.g., to store instructions executable by and data used by processing unit 1250). Storage subsystem 1212 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1212 may consist solely of volatile memory, in one embodiment. Storage subsystem 1212 may store program instructions executable by computing device 1210 using processing unit 1250, including program instructions executable to cause computing device 1210 to implement the various techniques disclosed herein.

I/O interface 1230 may represent one or more interfaces and may be any of various types of interfaces configured to couple to and communicate with other devices, according to various embodiments. In one embodiment, I/O interface 1230 is a bridge chip from a front-side to one or more back-side buses. I/O interface 1230 may be coupled to one or more I/O devices 1240 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising: receiving, at a computer system, from a monitoring agent interfacing with a user page for a transaction service, an error signal indicating an occurrence of an error related to an interaction of a user with the transaction service; determining, by the computer system, at least one causal factor for the error in response to receiving the error signal indicating the error and based on at least one contextual data item related to the interaction of the user with the transaction service, wherein the at least one contextual data item includes one or more images of the user page at a time of the error, and wherein the at least one causal factor is determined, at least in part, by providing the error signal and the images of the user page to a machine learning algorithm; determining, by the computer system, data needed to resolve the error based on the at least one causal factor; determining, by the computer system, a resolution flow based on the at least one causal factor, wherein the resolution flow is determined by accessing, from a database of rules for errors and learned error resolution flows, at least one rule and at least one learned error resolution flow corresponding to the at least one causal factor; and transmitting to the monitoring agent, by the computer system, the resolution flow, wherein the resolution flow includes information usable by the monitoring agent for implementation in the user page and for resolving the error based on receiving the data needed to resolve the error.

2. The method of claim 1, wherein the resolution flow includes information usable by the monitoring agent to resolve the error without redirecting the user to another user page.

3. The method of claim 1, wherein the resolution flow includes information usable by the monitoring agent to display information about the error on the user page.

4. The method of claim 1, wherein the at least one contextual data item includes data from the user page at the time of the error and data for at least one account of the user associated with the transaction service.

5. The method of claim 1, wherein determining the data needed to resolve the error based on the at least one causal factor includes accessing, from the database of rules for errors and learned error resolution flows, at least one rule corresponding to the at least one causal factor.

6. The method of claim 1, further comprising receiving, by the computer system, at least some data needed to resolve the error from at least one external domain, wherein the resolution flow is determined by accessing, from the database of rules for errors and learned error resolution flows, at least one learned error resolution flow corresponding to the at least one causal factor and the at least some data received from the at least one external domain.

7. The method of claim 1, wherein the machine learning algorithm includes an image-based learning algorithm, and wherein the at least one causal factor is determined, at least in part, by providing the error signal and the images of the user page to the image-based learning algorithm.

8. The method of claim 1, wherein the data needed to resolve the error includes data needed from the user to resolve the error, and wherein the resolution flow includes information usable by the monitoring agent to implement a request in the user page for the data needed from the user to resolve the error.

9. The method of claim 8, further comprising:
receiving data provided by the user corresponding to the request for the data needed from the user to resolve the error; and
resolving the error related to the interaction of the user corresponding to the resolution flow based on, at least in part, the received data provided by the user.

10. The method of claim 1, wherein the resolution flow includes information usable by the monitoring agent to display information about the error on the user page.

11. The method of claim 1, wherein the at least one contextual data item includes data from the user page at a time of the error and data for at least one account of the user associated with the transaction service.

12. The method of claim 1, wherein determining the data needed to resolve the error based on the at least one causal factor includes accessing, from the database of rules for errors and learned error resolution flows, at least one rule corresponding to the at least one causal factor.

13. A non-transitory computer-readable medium having instructions stored thereon that are executable by a computing device to perform operations, comprising: implementing a monitoring agent that interfaces with a user page for a transaction service, the monitoring agent monitoring the user page for errors related to interactions between users and the transaction service; detecting, through the monitoring agent, an occurrence of an error during an interaction of a user with the transaction service; determining, in response to detecting the occurrence of the error through the monitoring agent, at least one causal factor for the error, wherein the at least one causal factor is determined based on the error and at least one contextual data item related to the interaction of the user with the transaction service, wherein the at least one contextual data item includes one or more images of the user page at a time of the error, and wherein the at least one causal factor is determined, at least in part, by providing the error and the images of the user page to a machine learning algorithm; determining data needed to resolve the error based on the at least one causal factor; accessing the data needed to resolve the error; determining a resolution flow based on the at least one causal factor, wherein the resolution flow is determined by accessing, from a database of rules for errors and learned error resolution flows, at least one rule and at least one learned error resolution flow corresponding to the at least one causal factor; and implementing, through the monitoring agent, the resolution flow, wherein the resolution flow includes information usable by the monitoring agent for implementation in the user page and for resolving the error based on receiving the data needed to resolve the error.

14. The non-transitory computer-readable medium of claim 13, wherein accessing the data needed to resolve the error includes implementing in the user page, through the monitoring agent, a request for data needed from the user to resolve the error.

15. The non-transitory computer-readable medium of claim 13, wherein accessing the data needed to resolve the error includes interfacing with at least one external domain to access data needed to resolve the error.

16. The non-transitory computer-readable medium of claim 13, wherein the at least one contextual data item includes data from the user page at a time of the error and data for at least one account of the user associated with the transaction service.

17. The non-transitory computer-readable medium of claim 13, further comprising resolving the error related to the user interaction corresponding to the resolution flow.

18. The non-transitory computer-readable medium of claim 17, wherein resolving the error includes resolving the error through the interface of the monitoring agent with the user page without disengaging the user from the user page.

19. The non-transitory computer-readable medium of claim 13, wherein the non-transitory computer-readable medium includes instructions for a machine learning algorithm to determine the at least one causal factor.

20. A method, comprising: receiving, at a computer system, from a monitoring agent interfacing with a user page for a transaction service, an error signal indicating an occurrence of an error related to an interaction of a user with the transaction service; determining, by the computer system, at least one causal factor for the error in response to receiving the error signal indicating the error, wherein the at least one causal factor is determined based on the error signal and at least one contextual data item related to the interaction of the user with the transaction service, wherein the at least one contextual data item includes one or more images of the user page at a time of the error, and wherein the at least one causal factor is determined, at least in part, by providing the error signal and the images of the user page to a machine learning algorithm; determining, by the computer system, data needed to resolve the error based on the at least one causal factor, wherein the data needed to resolve the error includes data needed from the user to resolve the error; determining, by the computer system, a resolution flow based on the at least one causal factor, wherein the resolution flow is determined by accessing, from a database of rules for errors and learned error resolution flows, at least one rule and at least one learned error resolution flow corresponding to the at least one causal factor; and transmitting to the monitoring agent, by the computer system, the resolution flow, wherein the resolution flow includes information usable by the monitoring agent for implementation of a request in the user page for the data needed from the user to resolve the error and for resolving the error based on receiving the data needed from the user to resolve the error.

* * * * *